«12» United States Patent
Clayton et al.

[19]

[11] Patent Number: 6,137,651
[45] Date of Patent: *Oct. 24, 2000

[54] FLEXURED MOUNTING SYSTEM FOR FRICTION REDUCTION AND FRICTION LINEARIZATION IN LINEAR ACTUATOR FOR DISK DRIVE

[75] Inventors: Lawrence D. Clayton, Farmington; Carl E. Ellis, Layton; Todd Graves, Garland; Peter Shay, Bountivelle, all of Utah; Thomas J. Angellotti, Birmingham, Mich.; John C. Briggs, Layton, Utah; Paul Johnson, Kaysville, Utah; David E. Jones, Layton, Utah; Carl F. Nicklos, Ogden, Utah; Mark S. Thayne, West Point, Utah; Yiping Ma, Layton, Utah

[73] Assignee: Iomega Corporation, Roy, Utah

[*] Notice: This patent is subject to a terminal disclaimer.

[21] Appl. No.: 09/127,168
[22] Filed: Jul. 31, 1998

Related U.S. Application Data

[63] Continuation-in-part of application No. 08/866,168, May 30, 1997, Pat. No. 5,920,445.
[51] Int. Cl.[7] ....................................................... G11B 5/55
[52] U.S. Cl. .............................................................. 360/106
[58] Field of Search .............................................. 360/106

[56] References Cited

U.S. PATENT DOCUMENTS

| 4,504,879 | 3/1985 | Toldi et al. | 360/105 |
|---|---|---|---|
| 4,663,677 | 5/1987 | Griffith et al. | 360/71 |
| 4,663,682 | 5/1987 | McNeil | 360/105 |
| 4,683,506 | 7/1987 | Toldi et al. | 360/105 |
| 4,722,012 | 1/1988 | Toldi et al. | 360/97 |
| 4,740,851 | 4/1988 | Jones et al. | 360/97 |
| 4,787,000 | 11/1988 | Schulze | 360/105 |
| 4,811,143 | 3/1989 | Ohashi et al. | 360/105 |
| 4,901,173 | 2/1990 | Jones et al. | 360/99.04 |
| 4,965,685 | 10/1990 | Thompson et al. | 360/97.01 |
| 5,027,241 | 6/1991 | Hatch et al. | 360/105 |
| 5,291,359 | 3/1994 | Wolter | 360/104 |
| 5,508,864 | 4/1996 | Briggs et al. | 360/106 |
| 5,530,607 | 6/1996 | Spendlove | 360/105 |
| 5,920,445 | 7/1999 | Angellotti et al. | 360/106 |

FOREIGN PATENT DOCUMENTS

| 0 329 234 A1 | 8/1989 | European Pat. Off. |
| 195 36 172 A1 | 4/1996 | Germany |

Primary Examiner—Robert S. Tupper
Attorney, Agent, or Firm—Woodcock Washburn Kurtz Mackiewicz & Norris LLP

[57] ABSTRACT

Disclosed is a disk drive having a linear actuator for carrying read/write heads into engagement with a recording medium. The heads are mounted on a carriage assembly along with a voice coil motor for driving the carriage assembly into and out of engagement of the heads with the medium. The carriage assembly slides linearly on a central guide track. A flexure is provided for the central guide track for linear movement by the carriage assembly so that initial linear movement of the carriage assembly is by flexing the flexure and further, larger linear movement of the carriage assembly is by sliding along the guide track. In one form of the invention the central guide track is suspended at the front end by a flexure and at the rear end by a bearing. In another form of the invention the central guide track is suspended at each end by a flexure. The flexure has an attaching mechanism for attaching the flexure to the central guide track so that the flexure pivots freely on the central guide track. This eliminates the likelihood of bending of the central guide track and improves the ability of the system to reject 1f and 2f run out and therefore, track following.

19 Claims, 11 Drawing Sheets

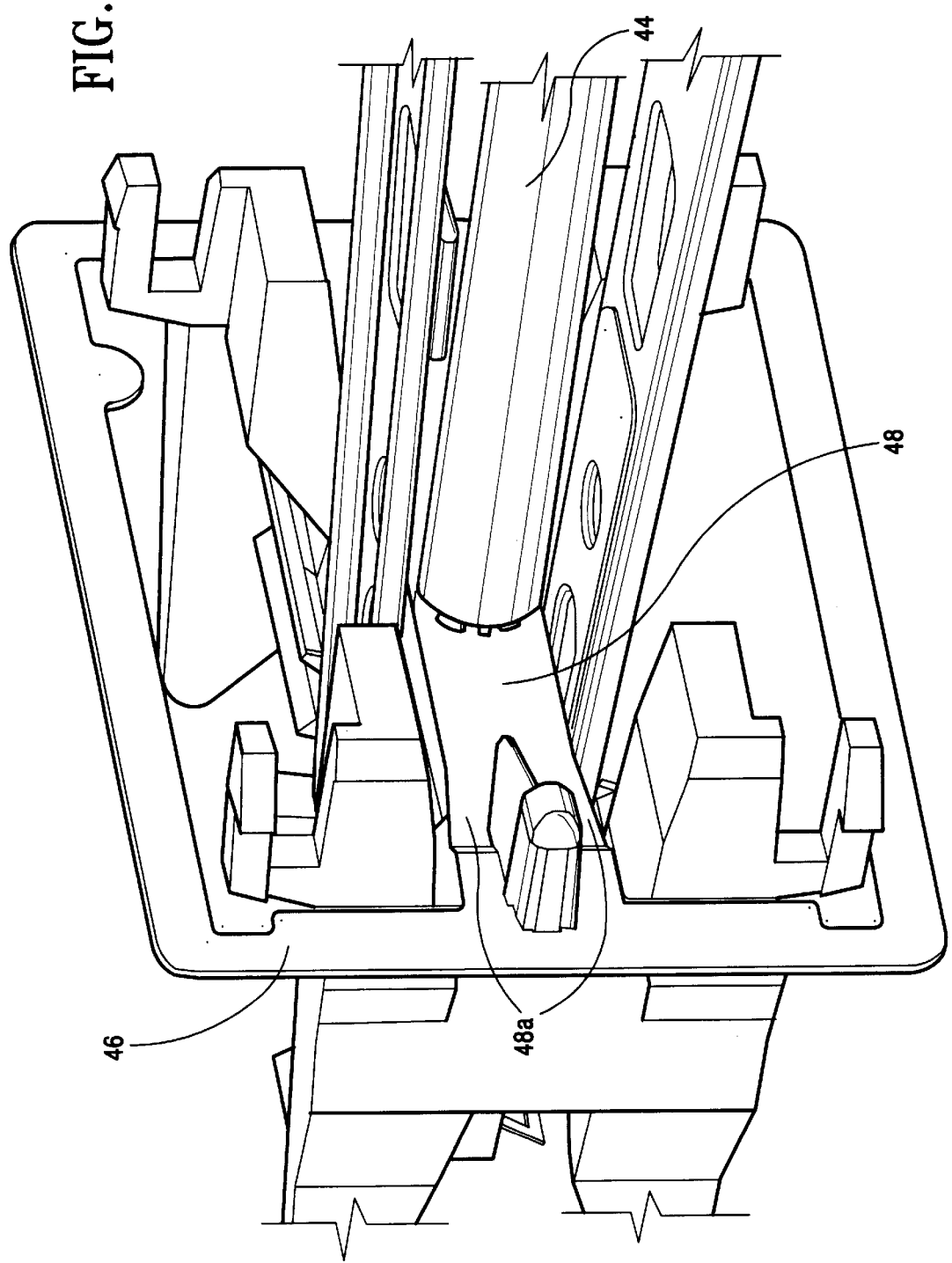

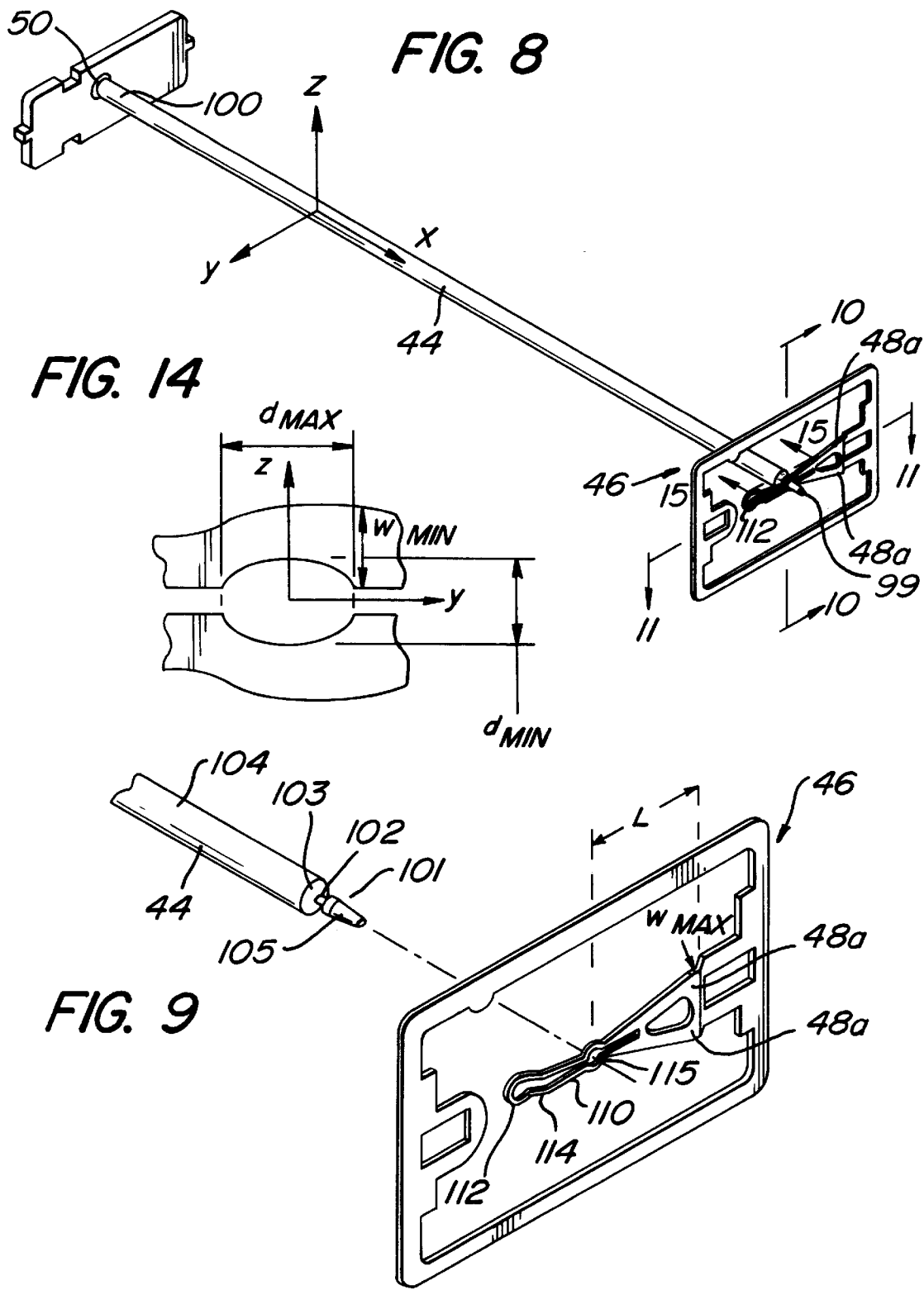

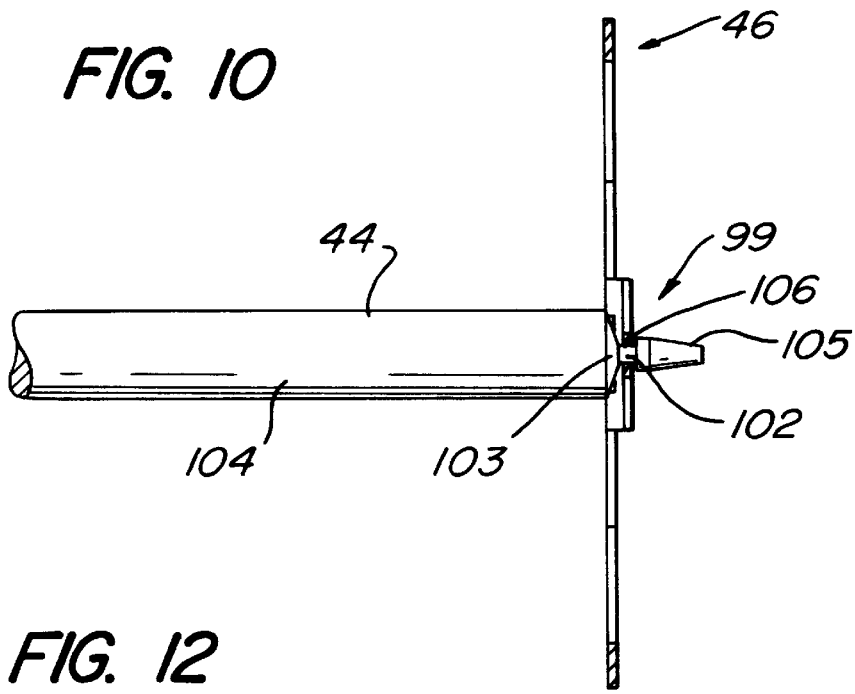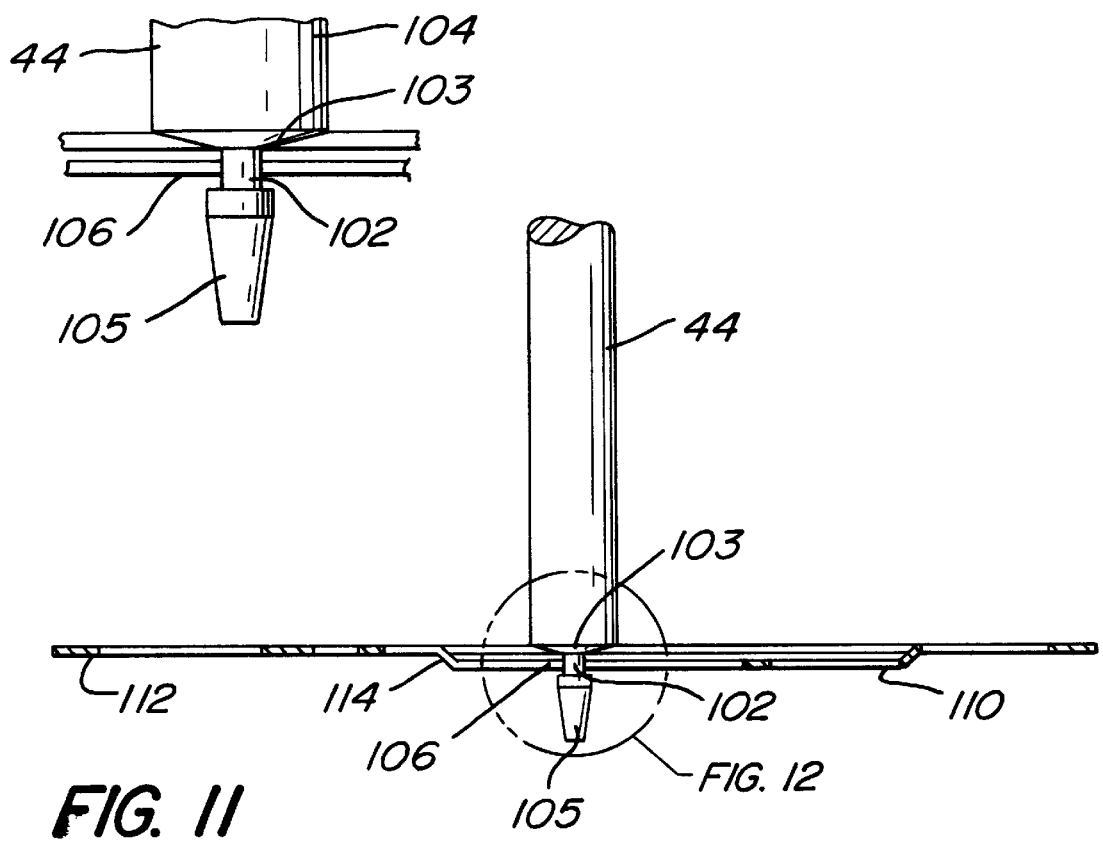

FLEXURED MOUNTING SYSTEM FOR FRICTION REDUCTION AND FRICTION LINEARIZATION IN LINEAR ACTUATOR FOR DISK DRIVE

This application is a continuing in part application of U.S. patent application Ser. No. 08/866,168, filed May 30, 1997, now U.S. Pat. No. 5,920,445 and hereby claims the benefit of the filing data of that application and incorporates that application by reference.

BACKGROUND OF THE INVENTION

This invention relates to a linear actuator for carrying read/write heads into engagement with a recording medium and more particularly, to a flexured mounting system for friction reduction and friction linearization in the linear actuator.

DESCRIPTION OF THE PRIOR ART

Disk drives for storing electronic information are found in a wide variety of computer systems, including workstations, personal computers, and laptop and notebook computers. Such disk drives can be stand-alone units that are connected to a computer system by cable, or they can be internal units that occupy a slot, or bay, in the computer system. Laptop and notebook computers have relatively small bays in which to mount internal disk drives and other peripheral devices, as compared to the much larger bays available in most workstation and personal computer housings. The relatively small size of peripheral bays found in laptop and notebook computers, can place significant constraints on the designer of internal disk drives for use in such computers. Techniques that address and overcome the problems associated with these size constraints are therefore important.

Disk drives of the type that accept removable disk cartridges have become increasingly popular. One disk drive product that has been very successful is the ZIP™ drive designed and manufactured by Iomega Corporation, the assignee of the present invention. ZIP™ drives accept removable disk cartridges that contain a flexible magnetic storage medium upon which information can be written and read. The disk-shaped storage medium is mounted on a hub that rotates freely within the cartridge. A spindle motor within the ZIP™ drive engages the cartridge hub when the cartridge is inserted in to the drive, in order to rotate the storage medium at relatively high speeds. A shutter on the front edge of the cartridge is moved to the side during insertion into the drive, thereby exposing an opening through which the read/write heads of the drive move to access the recording surfaces of the rotating storage medium. The shutter covers the head access opening when the cartridge is outside of the drive, to prevent dust and other contaminants from entering the cartridge and settling on the recording surfaces of the storage medium.

The ZIP™ drive is presently available for workstations and personal computers in both stand-alone and internal configurations. An example of such disk drive is shown in U.S. Pat. No. 5,508,864. In order to provide a version of the ZIP™ drive for use in laptop and notebook computers, the size constraints of the peripheral bays of such computers must be considered. In particular, for an internal drive to fit in the majority of laptop and notebook peripheral bays, the drive must be no longer than 135 mm. The height of the drive must be in the range of 12 to 15 mm. These dimensions place many constraints on the design of such a drive, and give rise to numerous design problems. The present invention addresses and overcomes one such problem.

One problem that a voice coil motor for a disk drive experiences is difficulty in handling both $1f$ and $2f$ run out during track following. A $1f$ run out occurs when the servo tracks of a disk-shaped storage medium are not exactly concentric with the center axis of the medium. A $2f$ run out occurs as a result of orthotropic deformation of the media due to temperature increases within the disk drive. A $2f$ run out occurs at twice the frequency of $1f$ run out. In order to accommodate the short length of the drive required for use in laptop and notebook computers, the bearings that support the linear actuator must be moved closer together. This results in higher friction loads on the actuator bearings and higher off track error signal. The frictional loads increase at the inner tracks of the disk because the media velocity is lower, resulting in more drag force on the heads. This makes it more difficult for the linear actuator to handle $1f$ and $2f$ run out during track following. It would be desirable to provide a central guide track on which an actuator carriage assembly carrying the heads slides linearly and a suspension flexibly mounting the central guide track for linear movement by the carriage assembly so that initial movement of the carriage assembly is by flexing the suspension and further, larger, linear movement of the carriage assembly is by sliding along the guide track.

SUMMARY OF THE INVENTION

In accordance with the present invention a disk drive having a linear actuator for carrying read/write heads into engagement with a recording medium is provided having a carriage assembly with the heads being mounted on the carriage assembly. A voice coil motor including a coil is mounted on the carriage assembly for driving the carriage assembly into and out of engagement of the heads with the medium. A central guide track is provided on which the carriage assembly slides linearly in a suspension flexibly mounting the central guide track for linear movement by the carriage assembly so that initial linear movement of the carriage assembly is by flexing the suspension and further, larger, linear movement of the carriage assembly is by sliding along the guide track. This enables the linear actuator to adequately handle both $1f$ and $2f$ run out during track following. In accordance with one aspect of the invention the central guide track is suspended at at least one end by a flexure. In accordance with another aspect of the invention the central guide track is suspended at the front end by a flexure and at the rear end by a bearing. Stop means may be provided at both ends of the central guide track to limit the travel to a predetermined distance.

In accordance with a second preferred embodiment of this invention, the flexure has an attaching mechanism for attaching the flexure to the central guide track to prevent binding of the central guide track and thereby improve the frequency response of the actuator. Preferably, the attaching mechanism is an interference fit between the flexure and the central guide track that includes a cutout structure within the flexure. This cutout structure can be press fit around the central guide track and preferably about a reduced diameter portion of the central guide track. In a preferred embodiment, the cutout structure defines a slot within the flexure. This cutout structure may be assembled to the central guide track by pressing the cutout structure onto and over an end of the central guide track. The cutout structure may be then slid along the end of the central guide track, which is preferably tapered, and then snapped onto a portion of the central guide track that is of reduced diameter relative to a larger diameter portion of the central guide track.

The cutout structure preferably exerts a force substantially in a direction that is perpendicular to the axis of movement of the actuator and perpendicular to the lateral plane that bisects the central guide track into an upper and a lower portion. This type of attachment mechanism minimizes or eliminates the force exerted on the central guide track in the lateral plane that bisects the central guide track. Preferably, the attaching mechanism applies a force at only two points along the diameter of the central guide track so that the flexure can pivot freely, yet be attached to the central guide track. By minimizing or removing the force in this lateral plane, the likelihood of binding the central guide track and an abrupt change in frictional force between the central guide track and the flexure is minimized. Moreover, this type of attaching mechanism enables the rod to pivot about the flexure. Since the flexure can pivot more freely with the attaching mechanism of this invention, the flexure system will maintain a more constant linear spring rate. This ensures that the fundamental resonant frequency of the flexure system will remain unchanged midway between the 1$f$ and 2$f$ frequencies for optimum rejection of run out and improved track following. This attaching mechanism enhances the frequency response of the actuator to 1$f$ and 2$f$ run out and reduces track following error.

For a more detailed disclosure of the invention and for further objects and advantages thereof, reference is to be had to the following description taken in conjunction with the accompanying drawings.

SHORT DESCRIPTION OF THE DRAWINGS

FIG. 6A is a partial perspective view on enlarged scale of the front flexure shown in FIG. 6;

FIG. 8 is a perspective view showing a flexure and a central guide track according to a second preferred embodiment of this invention;

FIG. 9 is a fractional perspective view of the embodiment of FIG. 8;

FIG. 10 is a cross section taken along line 10—10 of FIG. 8;

FIG. 11 is a cross section taken along line 11—11 of FIG. 8;

FIG. 12 is an exploded view of detail 12 of FIG. 11;

FIG. 14 is a diagrammatical view of a portion of the preferred embodiment of the flexure of FIG. 8;

DESCRIPTION OF THE PREFERRED EMBODIMENT

Figure 1:
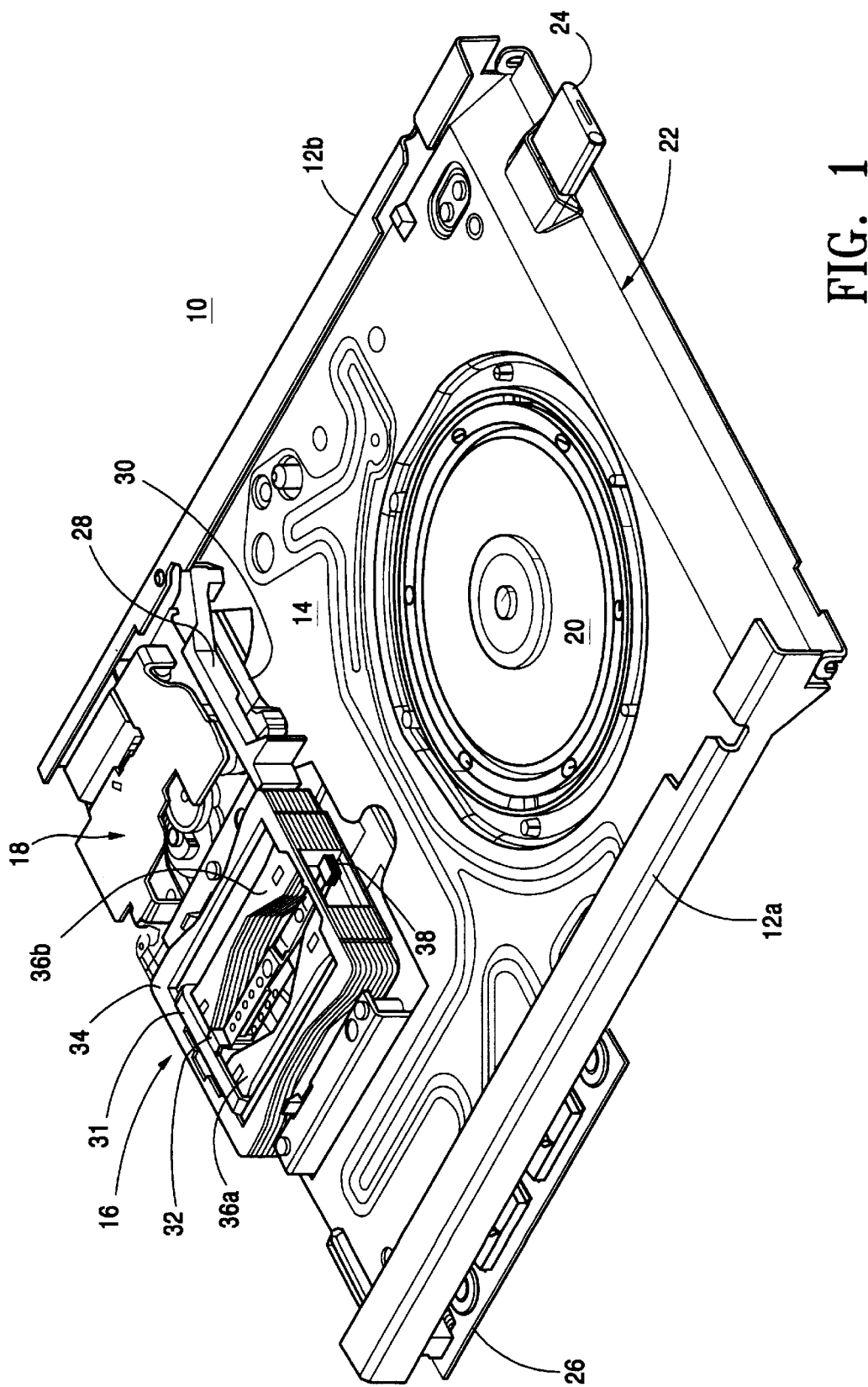
FIG. 1 is a perspective view of an exemplary disk drive in which the present invention is employed.

FIG. 1 shows an exemplary disk drive 10 in which the present invention may be employed. The disk drive 10 comprises a chassis 14 having unshaped outer edges that form opposed guide rails 12$a$, 12$b$ that guide a removable disk cartridge (not shown) into the disk drive through opening 22. In the present embodiment, the chassis is metallic. A thin metal top cover (not shown) of the disk drive 10 has been removed so that the internal components of the drive are visible.

A cartridge shutter lever 28 and an eject lever 30 are rotatably mounted on the chassis. Both levers 28 and 30 are shown in FIG. 1 in the positions that they occupy when a disk cartridge is fully inserted into the drive. During cartridge insertion, the shutter lever swings from a forward position to the position shown in FIG. 1. During this movement, an abutment surface on the shutter lever 28 engages a shutter of the disk cartridge and moves the shutter to the side, exposing a head access opening in the front peripheral edge of the cartridge. The eject lever also moves from a forward position to the position shown in FIG. 1, when the cartridge is inserted, In the position showriin FIG. 1, the eject lever is in a cocked position, under spring tension. When it is desired to eject the disk cartridge from the drive 10, an eject button 24 is pushed. Among other things, this causes the eject lever 30 to be released from its cocked position, so that it springs forward to force the disk cartridge backwardly out of the disk drive.

The disk drive 10 also has a linear actuator 16 disposed at the rear of the chassis 14. The linear actuator 16 comprises a voice coil motor including a coil 31 mounted on a carriage assembly 32, an outer magnet return path assembly 34, and two inner return paths 36$a$, 36$b$ on opposite sides of the carriage assembly 32. After a disk cartridge is inserted into the disk drive 10, the carriage assembly 32 carries a pair of read/write heads 38 over the recording surfaces of a disk-shaped storage medium within the cartridge. A spindle motor 20 is provided on the floor of the chassis 14. During cartridge insertion, the spindle motor 20 is translated vertically into engagement with a hub of the disk cartridge, in order to rotate the disk-shaped storage medium at a relatively high speed. A circuit board 26 is attached to the chassis 14 via a plurality of standoffs (not shown). The circuit board 26 carries the drive circuitry. A gear train mechanism 18 controls movement of the eject lever 30 and movement of a head retract mechanism (not shown) that moves the carriage assembly 32 to a parked position to prevent damage to the read/write heads 38, when the disk drive is not in use.

Figure 3:
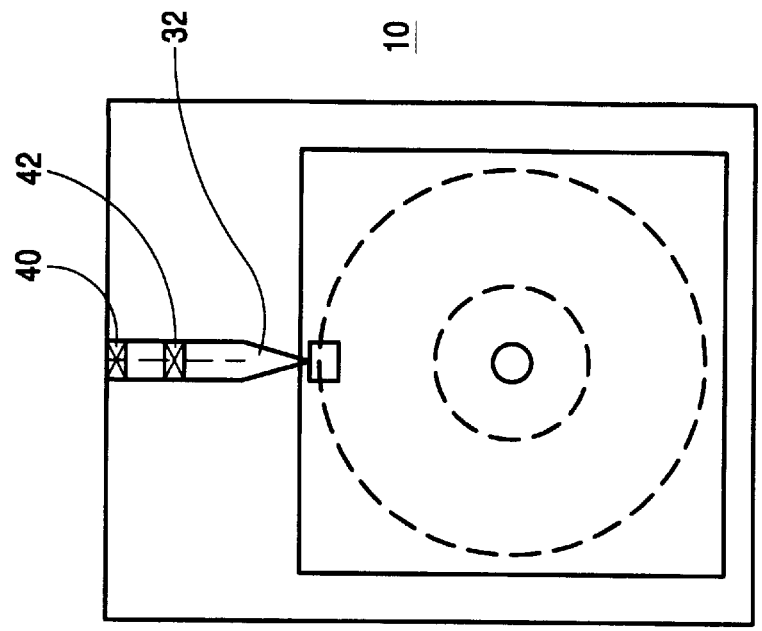
FIGS. 3 and 3A are diagrammatic views of a disk drive embodying the present invention showing the carriage assembly in the same two extreme positions.
Figure 2:
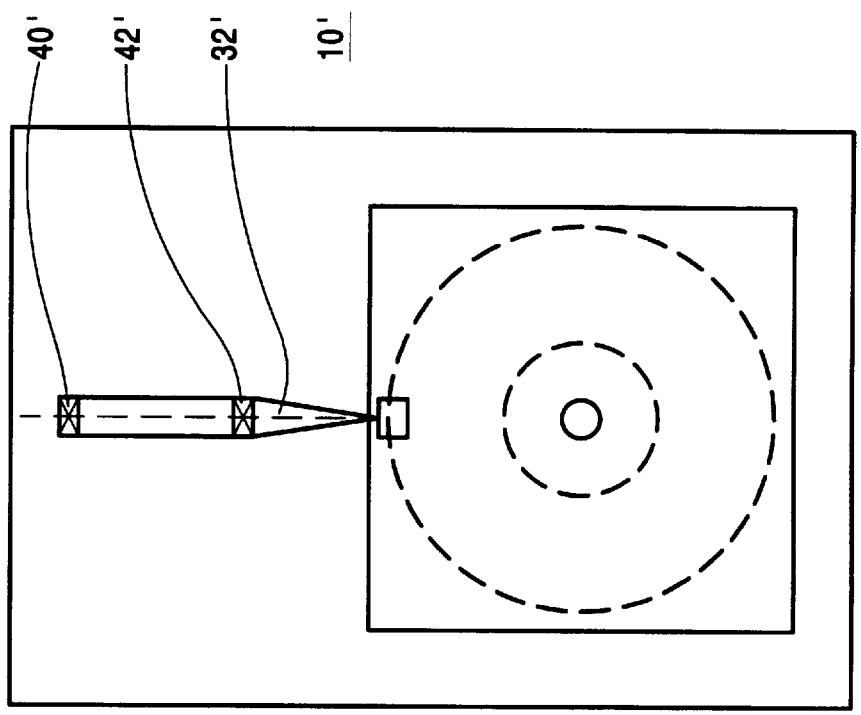
FIGS. 2 and 2A are diagrammatic views of a disk drive of the prior art showing the carriage assembly in two extreme positions.
Figure 3A:
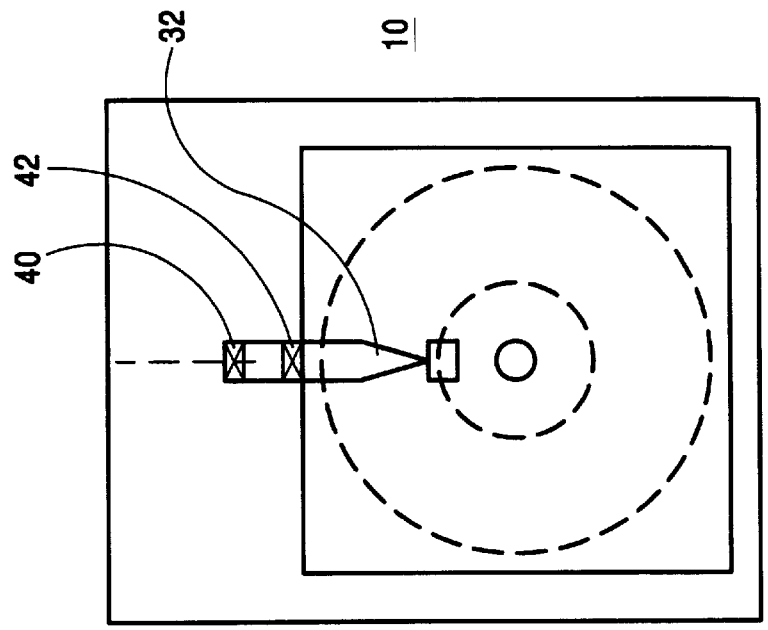
Figure 2A:
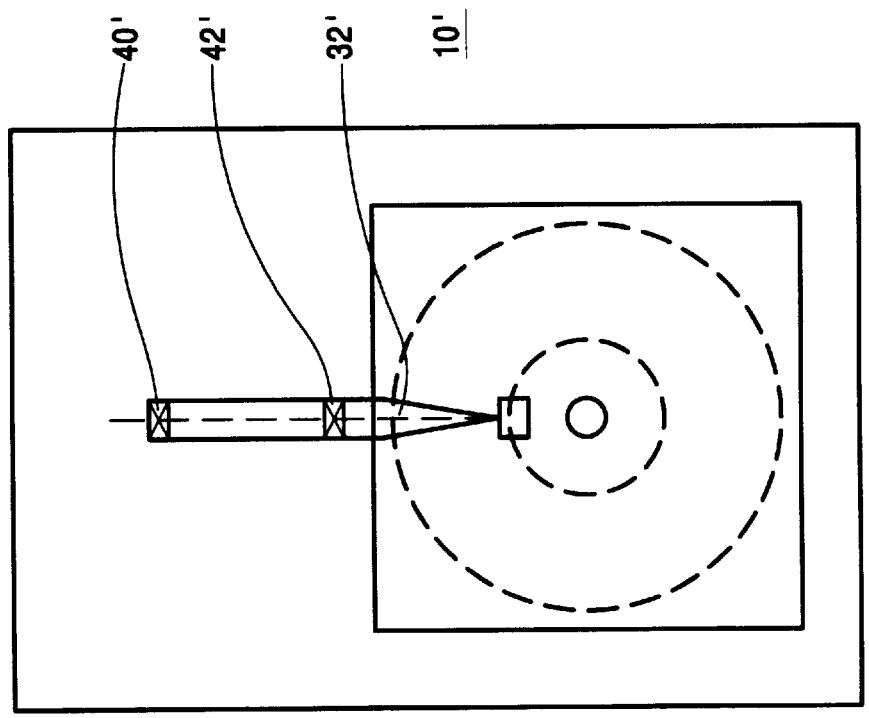
Figure 4:
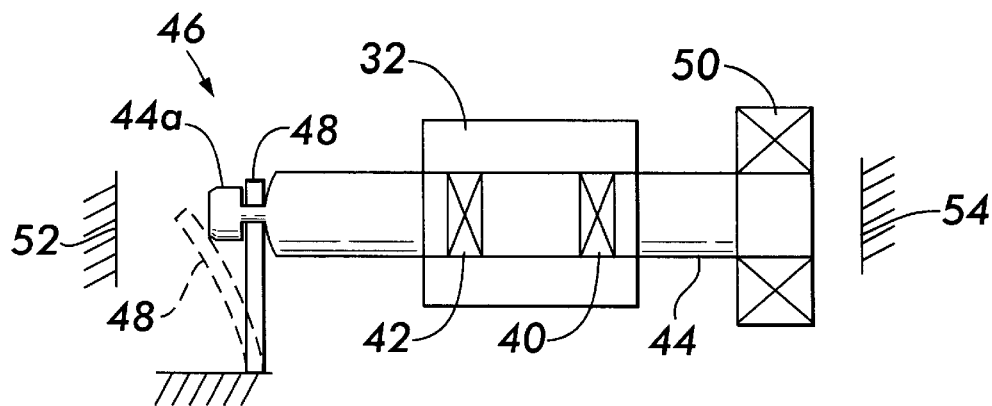
FIG. 4 is a diagrammatic view of a flexible suspension for mounting a carriage assembly in accordance with the present invention.

As referred to earlier in this application, the prior art ZIP™ disk drive is substantially longer than the disk drive 10 of the present invention. This is diagrammatically illustrated by comparing FIGS. 2 and 3 and FIGS. 2A and 3A where the ZIP drive 10' is shown in FIGS. 2 and 2A and the present drive 10 is shown in FIGS. 3 and 3A. In the ZIP drive 10' the carriage bearings 40', 42' may be spaced apart a substantial distance, e.g. about 18 mm. and there is still substantial room for the carriage at either end of its travel as shown in FIGS. 2 and 2A. As pointed out above, the drive for use in laptop and notebook computers must be no longer than 135 mm. In view of this, the spacing between the bearings 40 and 42 is reduced to only 7 mm and there is substantially no room at the ends of the travel of the carriage. The carriage assembly 32 is mounted on the spaced bearings 40, 42 which in turn are mounted on a central guide track 44 on which the carriage assembly 32 slides linearly. The central guide track 44 may be in the form of a round polished stainless steel rod and is best seen in FIGS. 4 and 6. The bearings 40, 42 have a low coefficient of friction and preferably are zirconia bearings. A flexible suspension is provided for mounting the central guide track 44 for linear movement by the carriage assembly 32 so that initial linear movement of the carriage assembly is by flexing the suspension and further, larger, linear movement of the carriage assembly is by sliding along the guide track 44. As shown in FIGS. 4 and 6, the front end of the guide track 44 is suspended by a flexure 46. As may be seen in FIG. 5 the flexure 46 has been illustrated in the form of a flat spring member having a rectangular mounting frame with a central opening. The frame 46 is adapted to be held in fixed position, and a flexible portion 48 extends from one side of the frame into the central opening. The flexible portion 48 of the spring member is connected to the frame by a pair of legs 48a. The flexible portion 48 also includes a free end 48b for connection to the front end 44a of the central guide track 44. The free end of 48b at the flexible portion 48 may be connected to the end of the central guide track 44 in any suitable manner such as by a slip fit, adhesive or a snap connection. The snap connection is preferred and is illustrated on enlarged scale in FIG. 5A where the flexible portion 48 of the spring member 46 includes cut-out structure at 48c for making a snap connection with the end 44a of the central guide track 44.

The rear end of the central guide track 44 is constrained by a zirconia bearing 50 which allows for axial travel of the central guide track 44. Placement of the bearing 50 at the rear of the rod 44 takes advantage of the lower reaction force at this end of the rod at the ID tracks on the disk, where the linear velocity is lowest and head drag increased. Stop structures 52 and 54 are provided at both ends of the central guide track 44 to limit the travel of the guide track in a preferred embodiment to about +/−300 microns. In other embodiments, the distance of travel of the guide track may vary depending upon the application, and the distance of about 300 microns is provided by way of example and not by way of limitation. In a preferred embodiment, the flexible portion 48 of the spring 46 has a constant linear spring rate. In one application of this invention, the spring rate is about 10–30 grams force/mm (about 100–300 N/m; 1f–2f run out). This application is provided by way of example and not by limitation. The spring member 46 may be made from any suitable material such as stainless steel or beryllium copper. The spring rate is chosen such that the fundamental resonant frequency of the carriage assembly 32, the central guide track 44 and the flexure 46 falls about midway between the 1f and 2f run out frequencies, which in a preferred embodiment is about 50 to 100 Hz. The fundamental resonant frequency is preferred because it takes less energy to maintain track following. The carriage assembly 32 of the actuator (containing the read/write heads and jewel bearings) rides along the central guide track or rod 44 to allow tracks to be reached on the disk. This system allows the rod or central guide track 44 to move with the actuator carriage for a short distance (about 200 microns) during track following. During the long seeks, the flexible portion 48 of the flexure 46 bends until the rod 44 is in contact with the hard stop 52. Then, once static friction is overcome, the actuator carriage 32 slides on the rod 44 until the desired track on the disk is reached. Track following can then resume at this location.

Figure 7:
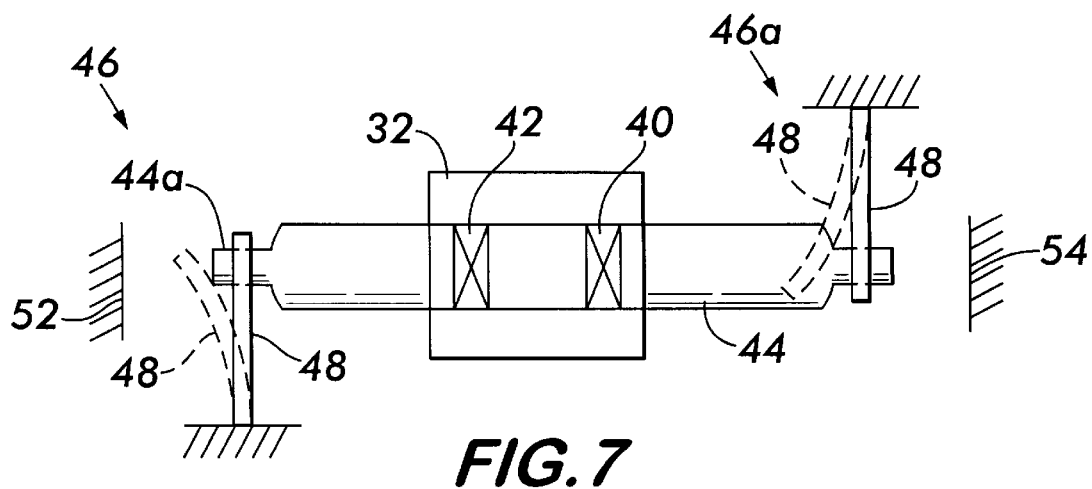
FIG. 7 is a diagrammatic view of another embodiment of the flexible suspension for mounting the carriage assembly in accordance with the present invention.

The present invention results in a much lower motional resistance of the carriage assembly and the actuator. During long seeks in the cartridge, zirconia bearings slide along the rod. During track-following (when a lower motional resistance is desired) the cartridge bearings and rod move together as a unit and the flexure 46 allows the rod to move axially. Utilizing the flexible suspension system of the present invention the PES (error signal) is comparable to the longer ZIP drive 10' illustrated in FIG. 2 even though the bearings 40 and 42 are only 7 mm apart in the carriage whereas the ZIP cartridge bearings are 18 mm apart. The present arrangement allows for a very short drive length required for notebook computers. Referring to FIG. 7 there is diagrammatically illustrated another embodiment of the flexible suspension for mounting the carriage assembly in accordance with the present invention. This embodiment is similar to the embodiment diagrammatically illustrated in FIG. 4 except the rear end of the rod 44 is also suspended by a flexure 46A which is identical to the front flexure 46. The flexure 46A replaces the bearing 50. While the dual flexure system illustrated in FIG. 7 provides satisfactory friction reduction and friction linearization in the linear actuator for the disk drive, the use of the rear flexure 46A in the system is more fragile than the use of the bearing 50 shown in the support system in FIG. 4. The rear flexure 46A gets the most stress because it bears most of the weight of the carriage when it is in the parked position where the drive is often subject to the shocks encountered during shipment and installation. The bearing 50 of FIG. 4 withstands such stress better than the two flexure system of FIG. 7.

In both of the embodiments of the invention described herein the flexure supported rod 44 is free to move axially (in the direction of the actuator motion) for a small distance to accommodate 1f and 2f run out. For longer seeks of the actuator, the flexure 46 deflects until the spring force exceeds the frictional force of the bearings on the rod 44. At this point the head/carriage assembly 32 slides along the rod 44 to its new position.

In a preferred embodiment, the optimum spring rate for the rod-on-flexures system is in the range of 10–30 grams force/mm (about 100–300 N/m), which assures that the flexures will absorb approximately 3 to 5 tracks (36–60 microns) of motion without slippage of the bearings on the rod. As alluded to above, in a preferred embodiment, the system has stops 52, 54 built in which limit the flexures to +/−300 microns of motion.

The optimum spring rate for the rod-on-flexures system places the fundamental resonant frequency roughly mid-way between the 1f and 2f run out frequencies. This assures that the flexures will absorb several tracks (about 12 microns per track in a preferred embodiment) of carriage assembly 32 motion without the bearings slipping on the rod.

The flexure supported rod concept allows the track-following behavior of the drive to approach that of a zero-friction system. This enables the linear actuator to substantially reject or eliminate the effects of both 1f and 2f run out during track following. The sliding coefficient of friction (zirconia bearings on polished or unpolished stainless steel) occurs only during long seeks. The flexured rod allows an extremely small and light actuator to be used. It facilitates high track density and higher capacities become possible.

Another preferred embodiment of this invention is illustrated in FIGS. 8–14. While the embodiment of the invention described above has proven satisfactory, the second preferred embodiment is an optimization of the embodiment described above. This second preferred embodiment also includes a central guide track 44 and a flexure 46 mounted within a disk drive for flexing of a linear actuator 16. Similar to the first embodiment, initial movement of the actuator is by movement of the flexure 46 and further movement is by sliding along the central guide track 44. In this second preferred embodiment, the flexure 46 includes an attaching mechanism 99 for attaching the flexure 46 to the central guide track 44, so as to improve the frequency response of the actuator to 1f and 2f run out and reduce track following error.

In the embodiment shown in FIGS. 8–15, the central guide track 44 includes a first end 100 and a second end 101. The first end 100 is for mounting to a bearing 50, as shown in FIG. 8, or a flexure, and the second end 101 is for mounting to the flexure 46. Preferably, the second end 101 has a reduced diameter portion 102 for mounting to the flexure 46. The central guide track 44 may further include a tapered portion 103 for connecting a larger diameter portion 104 to the reduced diameter portion 102 and a tip 105 for retaining the flexure 46 on the reduced diameter portion 102, as described below. The tip 105 may have any of a variety of shapes, such as a constant diameter or a tapering diameter. In the embodiment depicted in FIGS. 8–12, the tip 105 has both a portion that is of constant diameter and a portion of tapering. Preferable, at least a portion of the tip 105 has a diameter that is larger than the diameter of the reduced diameter portion 102, so that, as described below, the attaching mechanism 99 of the flexure 46 can be attached to the reduced diameter portion 102 in between the larger diameter portion 104 and the tip 105.

Figure 15:
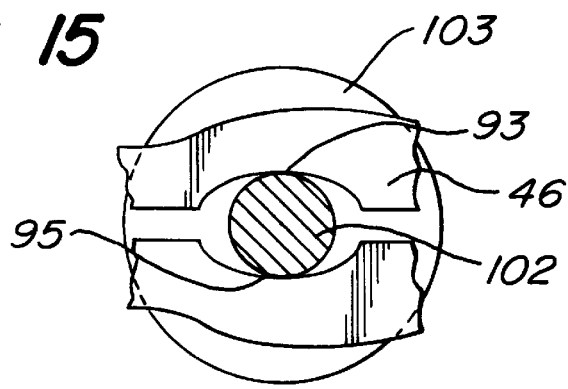
FIG. 15 is a cross-section taken along line 15–15 of FIG. 8.

In the second preferred embodiment, the flexure 46 has an attaching mechanism 104 for attaching the flexure to the central guide track 44. Similar to the first embodiment, the flexure 46 may also include legs 48a. The attaching mechanism 99 preferably includes a cut out structure 106 that defines a slot 108 within the flexure 46. As shown in FIGS. 8–12, the cut out structure 106 preferably can be snap fit or fit with an interference fit to the reduced diameter portion 102 of the central guide track. As is described in more detail below, the attaching mechanism improves the frequency response of the actuator to 1f and 2f run out. The slot 108 defined by the cut out structure 106 preferably extends farther in the y-direction, as shown in FIGS. 8–9 and 14. The slot 108 preferably has a portion 115 into which the central guide track 44 can be inserted, as shown in FIG. 9. This portion 115 preferably has a minimum dimension, $d_{min}$, and a maximum dimension, $d_{max}$, as shown in FIG. 14. As described in more detail below, the cut out structure 106 preferably provides two points 93, 95 of contact, as best seen in FIG. 15, between the flexure 46 and the central guide track 44 when the central guide track 44 is inserted into the portion 115 of the slot 108. These points of contact are preferably at the ends of the minimum dimension $d_{min}$. By contacting the central guide track 44 at two points, the flexure 46 is free to pivot about the two points of contacts, as is best shown in FIG. 15.

In order to understand the operation of the attaching mechanism 99, it should be understood that an actuator may have an x, y, and z axis, as is depicted in FIG. 8. The x direction may be defined along the longitudinal axis of the central guide track 44 and in the direction of motion of the actuator. The y direction is defined in a direction perpendicular to the x direction and in the lateral plane of the central guide track, and the z direction is perpendicular to the x and y directions and is in the vertical or upward direction. These directions are also shown in FIG. 14.

To further understand the optimization provided by the second embodiment, a further explanation of the first embodiment is provided. The attaching mechanism of the first embodiment, as is best shown in FIG. 5A may exert an interference force almost completely around the periphery of the central guide track 44 because the interference fit is almost a complete circle. Experience has shown that although this embodiment is satisfactory, the potential exists that the central guide track 44 could bind on the flexure 46 or cause an abrupt change in the frictional force due to the force from the interference fit being applied almost entirely around the circumference or periphery of the central guide track 44. This binding or abrupt change in the frictional force has the potential to inhibit movement of the actuator 16 and the response of the actuator 16 to 1f and 2f run out.

The attaching mechanism 99 of the embodiment of FIGS. 8–15 includes a cutout structure 106 within the flexure 46. The cutout structure 106 in the second embodiment of the flexure is pressed over the tip 105 of the central guide track 44 and snaps back onto the reduced diameter portion 102 once past the tip 105. The larger diameter portion 104 and the increased diameter portion of the tip 105 relative to the reduced diameter portion 102 aid in retaining the flexure 46 on the reduced diameter portion 102. The optimal cutout structure 106 is improved because it attaches the flexure 46 to the central guide track 44 without applying interference forces around a substantial portion of the periphery of the reduced diameter portion 102 of the central guide track 44. The optimal cutout structure 106 is elongated or slotted with a minimum dimension $d_{min}$, shown in FIG. 14, which interferes with or contacts the reduced diameter section of the guide track at two points along the Z-axis. That is the cutout structure 106 contacts the reduced diameter portion 102 at two diametrically opposite points along the Z axis. Perpendicular to a line connecting the contact points, the elongated or slotted cutout structure maximum dimension $d_{max}$, which is also shown in FIG. 14, provides clearance between the flexure 46 and the rod 44 allowing the flexure 46 to pivot freely on the rod 44 during movement of the carriage assembly. In this embodiment, interference forces around the periphery of the reduced diameter portion 102 are replaced by two forces at two contact points. This minimizes the contact between the flexure 46 and the rod 44 and substantially reduces the likelihood of binding or an abrupt change in the frictional force with motion of the carriage assembly 32. As will be appreciated, minimizing the likelihood of binding or an abrupt change in frictional forces with a joint which pivots freely about the Z-axis will maintain a constant linear spring rate for the flexured mounting system. A constant spring rate insures the fundamental resonant frequency for the carriage assembly 32, central guide track 44, and flexure 46 will remain unchanged midway between the 1f and 2f frequencies for optimum rejection of run out and improved track following. The ability of the actuator to reject 1f and 2f run out is also enhanced for the improved flexure by a reduction in energy loss to friction at the flexure to rod pivoting joint (i.e. an increased mechanical quality factor or Q). A joint which pivots freely also reduces stress in the flexure during flexing and allows a thicker more robust flexure (0.003 in.) to be used and still achieve a frequency which is midway between the 1f and 2f frequencies.

This second embodiment may, similar to the first embodiment, also employ stops. Moreover, the first end of the central guide track 44 can be mounted on a flexure rather than a bearing 50, as depicted in FIG. 8.

As is shown in the embodiment of FIGS. 8 and 11, the flexure 46 is not flat and may have a first portion 110 that extends in a first plane that has a constant x axis coordinate and a second portion 112 that has a constant x axis coordinate that is different than the x axis coordinate of the first portion 110. Although the flexure 46 is not flat in the embodiment shown, it may be flat in other embodiments. A connecting portion 114 may be angled to connect this first portion 110 to the second portion 112. This structure may contribute to achieving a desire spring constant of the flexure and a frequency response of the actuator. The spring constant of the embodiment of the flexure 46 shown in FIGS. 8–13 is about 236 N/m±5%. This spring constant of about 236 N/m is provided in a preferred embodiment in which the mass of the carriage assembly 32 and the rod 44 is about 0.0010584 N-s$^2$/m and produces a 1f/2f rejection resonance of about 75 Hz. In this embodiment, the 1f frequency is about 49 Hz and occurs at about 2940 rpm and the 2f frequency is about 98 Hz and occurs at about 5880 rpm. These specifications are provided by way of example and not by way of limitation. For instance, if the mass of the system, such as the mass of the carriage assembly and/or the rod, was changed, the spring rate would have to be changed to maintain the resonant frequency at about 75 Hz. Moreover, if the speed of rotation of the data storage medium was changed, the 1f and the 2f run out frequencies would change and the flexure spring rate would have to be adjusted accordingly, so that it is preferably midway between the 1f and 2f run out frequencies. In summary, the spring rate is selected based on a given mass of a carriage assembly and rod and speed of rotation of a data storage medium, so that the resonant frequency is approximately mid-way between the 1f and 2f frequencies.

The preferred embodiment of the flexure 46 also has an optimal structure that enables the flexure 46 to adequately handle the insertion stress when the central guide track 44 is inserted into the slot 115 and at the same time have sufficient load carrying capability and a minimal weight and size. As will be appreciated, when the central guide track 44 is inserted into the slot 115 of the flexure 46, as shown in FIG. 9, insertion stresses are created in the flexure 46 because of the interference fit being created between the flexure 46 and the central guide track 44. In order to minimize these insertion stresses, it is desired to have a relatively long length L of the flexure 46 because the increased length L of the flexure 46 reduces the insertion stresses. However, increasing the length L of the flexure 46 can reduce the load carrying ability of the flexure 46 and the ability of the flexure 46 to resist dynamic forces. The preferred embodiment shown in FIGS. 8–13 addresses both of these competing considerations.

Figure 5:
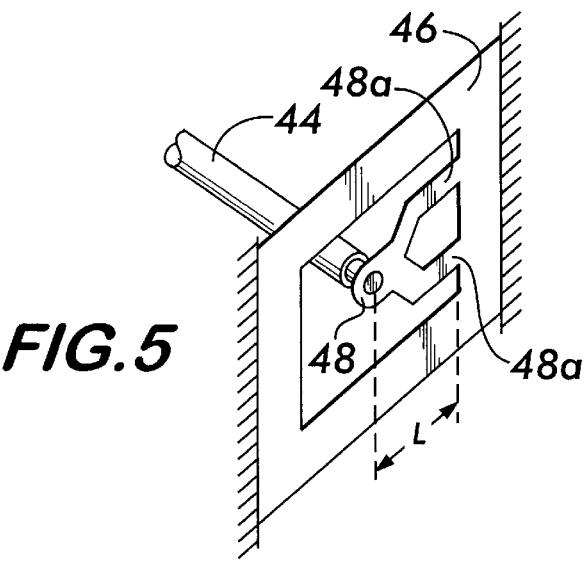
FIG. 5 is a perspective view of the flexure shown in FIG. 4.
Figure 5A:
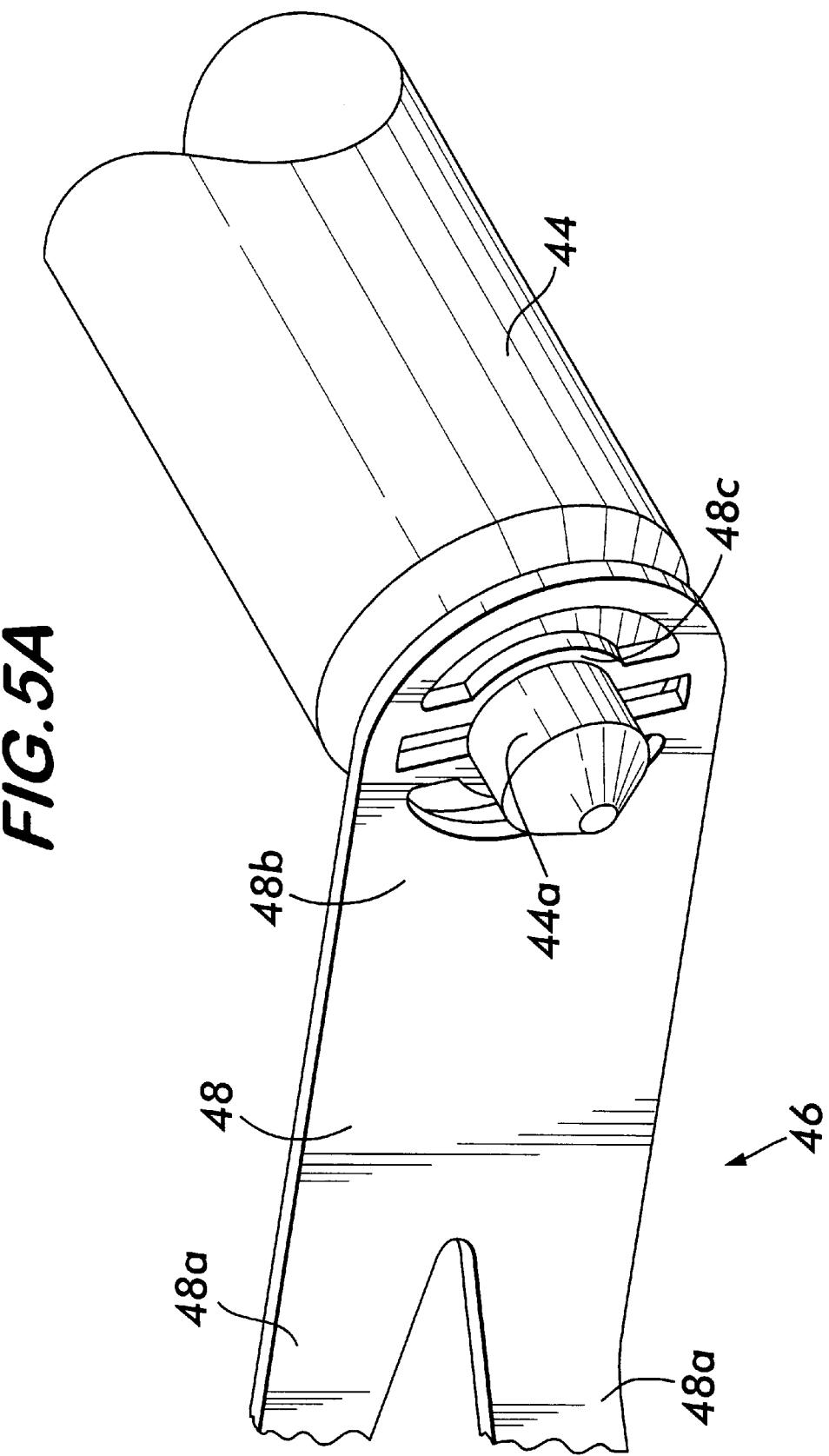
FIG. 5A is a fractional perspective view on enlarged scale showing the flexure shown in FIG. 5.
Figure 6:
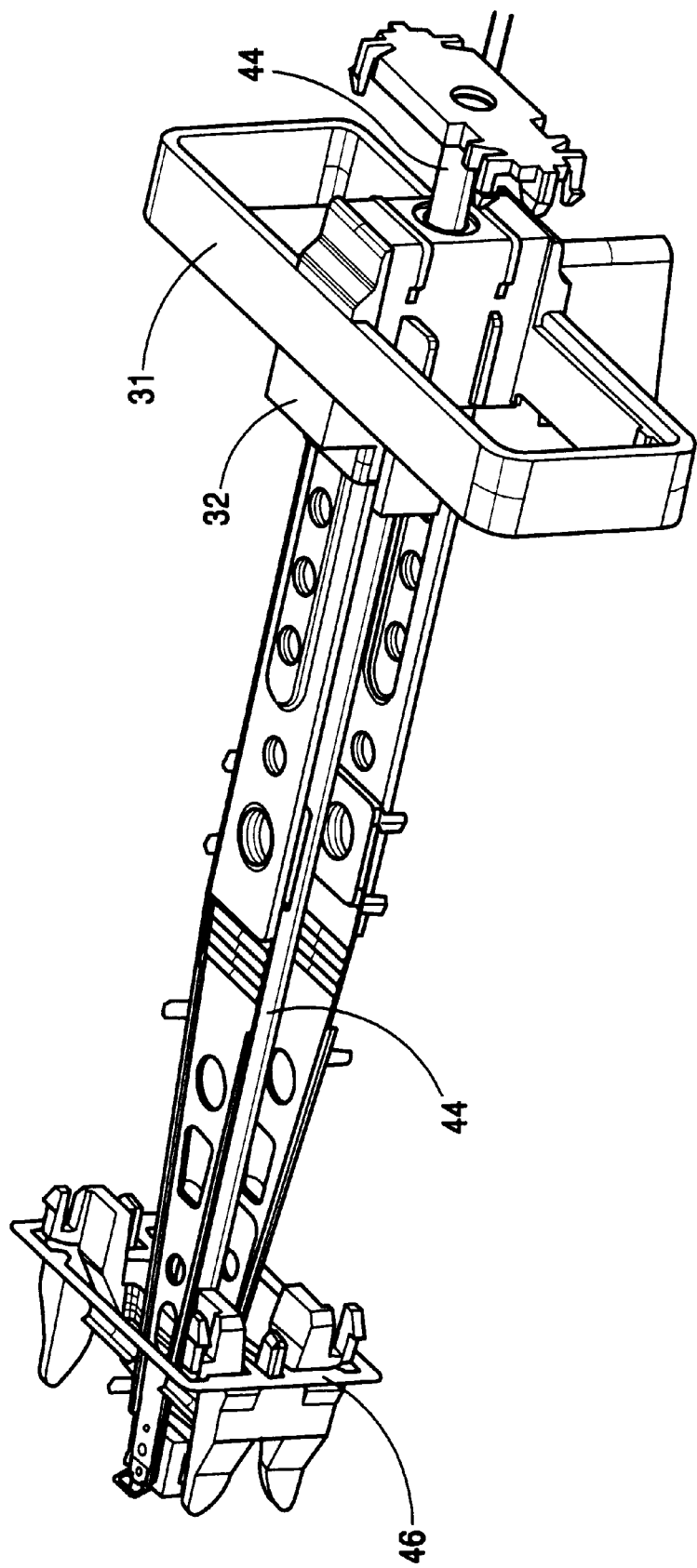
FIG. 6 is a perspective view on enlarged scale of the flexible suspension for mounting the carriage assembly of FIG. 1 as diagrammatically shown in FIG. 4.
Figure 13:
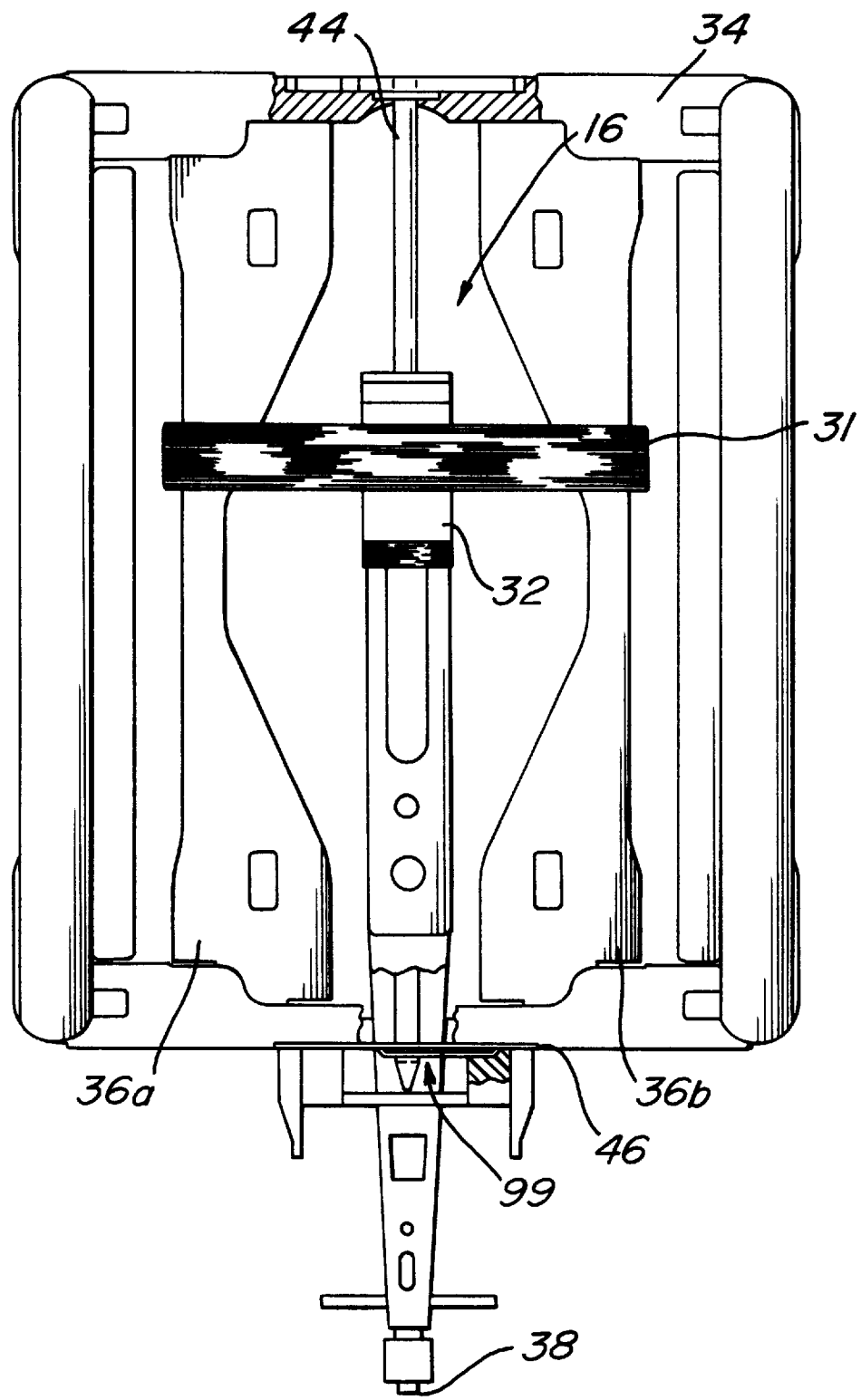
FIG. 13 is a plan view of a portion of a disk drive employing the embodiment of FIG. 8.

As shown in FIGS. 8 and 9, the length L of the flexure 46 is increased relative to the flexure shown in FIGS. 5 and 5A. As described above, this reduces the insertion stresses on the flexure when inserting the central guide track 44 into the flexure 46. Increasing the length L of the flexure 46 tends to decrease its load carrying ability and ability to handle dynamic loading conditions, as alluded to above. One way to increase the strength of the flexure 46 would be to increase its overall width. However, this would have the undesirable effect of potentially increasing the cost of the drive and making it heavier. The present invention enables the length of the flexure to be increased to lessen the insertion stresses and maintain its ability to handle dynamic loading while minimizing the width and the weight of the flexure 46.

The present invention accomplishes this by having a sufficient width to handle the loading conditions. Preferably, the width of the flexure tapers from a maximum width $W_{max}$ of about 0.4 to 0.5 mm. to a minimum width $W_{min}$ of about 0.2 to 0.3 mm. The tapering of the width of the flexure 46 creates sufficient structure to adequately handle the loading conditions that are typically applied to the flexure 46, but minimizes the thickness and the amount of material needed to handle that is typically applied to the flexure. Thus, in this preferred embodiment of FIGS. 8–15, the insertion stresses are lowered on the flexure 46 and the flexure 46 can handle the dynamic forces that are typically applied to the flexure and the overall size and weight of the flexure is minimized.

Figure 16:
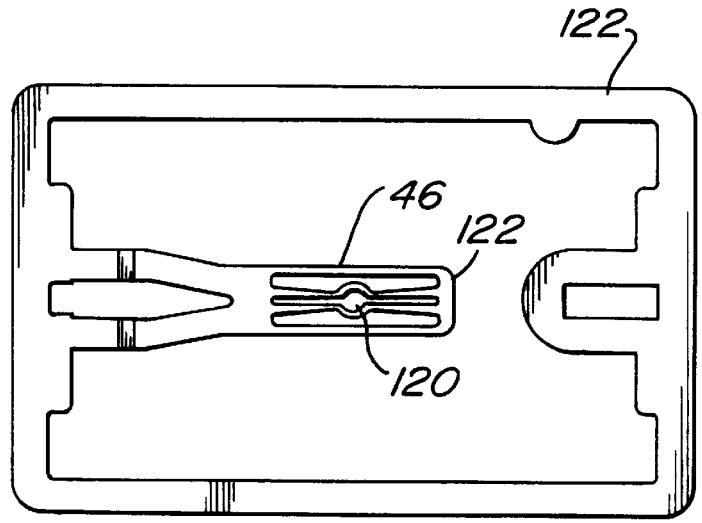
FIG. 16 is a third preferred embodiment of the flexure of this invention.

Another embodiment of the flexure 46 of this invention is shown in FIG. 16. In this embodiment, the flexure 46 has a slot 120 for insertion of a central guide track 44, as described above. In this embodiment, the slot 120 is round so that, similar to the embodiment of FIGS. 5 and 5A, the interference forces are applied around a substantial periphery of the central guide track. In this embodiment of FIG. 16, the length L was increased relative to the embodiment of FIGS. 5 and 5A to reduce the insertion stresses. However, this embodiment had a frame 122 to increase the ability of the flexure 46 to handle dynamic loads. As can be seen the frame 122 makes the size and weight of the flexure 46 larger relative to the embodiment of FIGS. 8–15.

Figure 17:
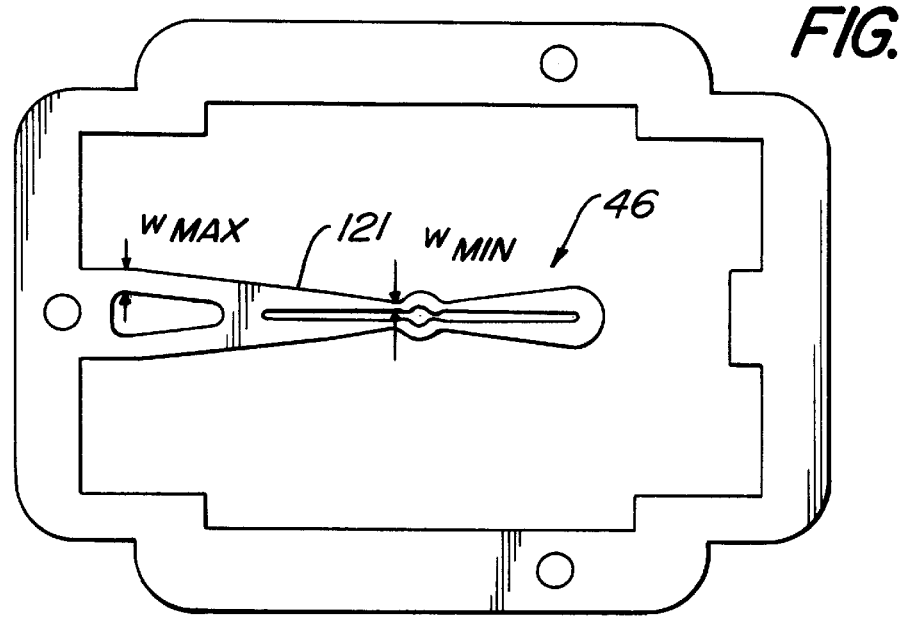
FIG. 17 is a fourth preferred embodiment of the flexure of this invention.

FIG. 17 illustrates a fourth embodiment of a flexure of this invention. As can be seen the length L of the flexure 46 was increased to reduce the insertion stresses. The flexure also has a "bow-tie" type shape in order to reduce the size and weight of the flexure 46 relative to the embodiment of FIG. 16. This bow-tie type shape minimizes the size and weight of the flexure 46 relative to the embodiment of FIG. 16 while enabling the flexure 46 to be robust enough to handle various loading conditions. This bow-tie type shape is similar to that employed in FIGS. 8–15 where the width of the flexure is tapered in order to minimize the size and weight of the flexure, yet enable the flexure to handle loading conditions. The flexure 46 of FIGS. 8–15 is improved over the flexure 46 of FIG. 17 because the flexure of FIG. 17 has a cut out structure that defines a portion of a circle, so that interference forces are placed around a substantial portion of the periphery of the central guide track when the central guide track 44 and the flexure 46 are placed together in an interference fit.

In summary, the attaching mechanism of the flexure 46 in the second embodiment reduces the surface area of contact between the flexure 46 and the central guide track 44 and does so by minimizing the forces applied in the y direction. By attaching the flexure 46 to two contact points and minimizing the forces applied in the y direction, the likelihood of binding and an abrupt change in the frictional force is minimized. This improves the frequency response of the actuator and its ability to respond to 1f and 2f run out.

While there have been described preferred and alternate embodiments of the invention, it will be understood that further modifications may be made without departing from the spirit and scope of the invention as set forth in the appended claims.

What is claimed is:

1. A disk drive having a linear actuator for carrying read/write heads into engagement with a recording medium comprising:
    a carriage assembly, said heads being mounted on said carriage assembly;
    a voice coil motor including a coil mounted on said carriage assembly for driving said carriage assembly into and out of engagement of said heads with said medium;

a central guide track on which said carriage assembly slides linearly in a first direction;

a first flexure for flexibly mounting the central guide track so that initial linear movement of the carriage assembly is by flexing the first flexure; and an attaching mechanism for attaching the first flexure to the central guide track so that an interference force is exerted at two points on a periphery of the central guide track and the first flexure is thereby pivotable about the two points and a frequency response of the actuator is thereby enhanced.

2. The disk drive of claim 1, wherein the attaching mechanism attaches the flexure to the central guide track so that the first flexure can pivot freely about an axis that is vertical with respect to the disk drive so that a spring rate of the first flexure is approximately constant.

3. A disk drive according to claim 1, wherein said first flexure has a spring rate that maintains a resonant frequency of the flexure about midway between a 1f and a 2f frequency of the disk drive created by rotation of the recording medium in the disk drive.

4. A disk drive according to claim 1, wherein a spring rate of the flexure maintains a resonant frequency of the flexure about between a 1f and a 2f frequency of the disk drive created by a rotation of the recording medium in the disk drive.

5. The disk drive according to claim 1, further comprising a second flexure mounted to the central guide track.

6. The disk drive according to claim 1 further comprising a bearing on which an end of the central guide track is mounted.

7. The disk drive according to claim 1, wherein said central guide track comprises a rod.

8. The disk drive according to claim 1, further comprising a stop for limiting axial movement of the central guide track.

9. The disk drive of claim 1, wherein the central guide track has a first portion and a second portion and a diameter of the first portion that is larger than a diameter of the second portion.

10. The disk drive of claim 9, wherein the attaching mechanism attaches the first flexure to the second portion of the central guide track.

11. The disk drive of claim 9, wherein the central guide track further comprises an end that is tapered.

12. A disk drive comprising:

an actuator having heads for interfacing with a data storage medium;

a voice coil motor coupled to the actuator for moving the actuator;

a central guide track mounted with in the disk drive so that the actuator can move along the central guide track in a first direction as it moves to interface with a data storage medium;

a first flexure flexibly mounted to the central guide track so that initial linear movement of the actuator is by flexing the first flexure; and an attaching mechanism for attaching the first flexure to the central guide track by applying an interference force at two points on a periphery of the central guide track, so that a resonant frequency of the flexure is maintained about midway between a 1f and a 2f frequency of the disk drive created by rotation of the data storage medium within the disk drive.

13. The disk drive of claim 12, further comprising a carriage assembly mounted on the central guide track and coupled to the actuator for movement of the actuator along the central guide track.

14. The disk drive of claim 12, further comprising a stop for limiting movement of the actuator.

15. The disk drive of claim 12, wherein the actuator comprises a linear actuator.

16. The disk drive of claim 12, wherein the central guide track comprises a first portion and a second portion and a diameter of the first portion that is larger than a diameter of the second portion.

17. The disk drive of claim 12, wherein the attaching mechanism comprises a cut out structure that defines a slot for snapping the flexure onto the central guide track and exerting a force on the central guide track primarily in a third direction that is perpendicular to the first direction.

18. The disk drive of claim 17, where in the third direction is in a vertical direction of the disk drive.

19. A flexure for enhancing the frequency response of an actuator of a disk drive that has read/write heads, comprising:

a frame; and an attaching mechanism for attaching the flexure to a central guide track of a disk drive upon which the actuator moves, the attaching mechanism comprising a cut out structure that defines a slot for snapping onto the central guide at two points along a periphery of the central guide track.

* * * * *